May 28, 1946.  G. E. BURTON  2,401,224
VIEWER FOR OPTICAL INSTRUMENTS
Filed May 8, 1945  2 Sheets-Sheet 1
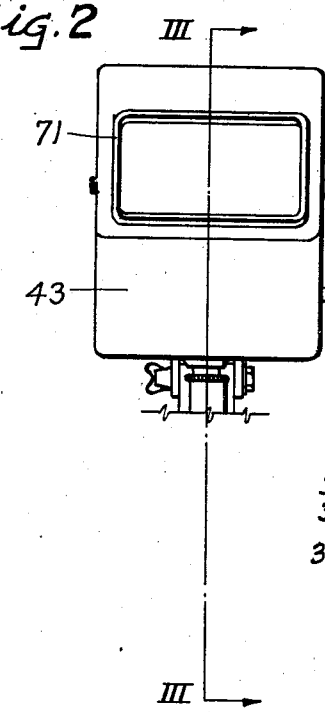
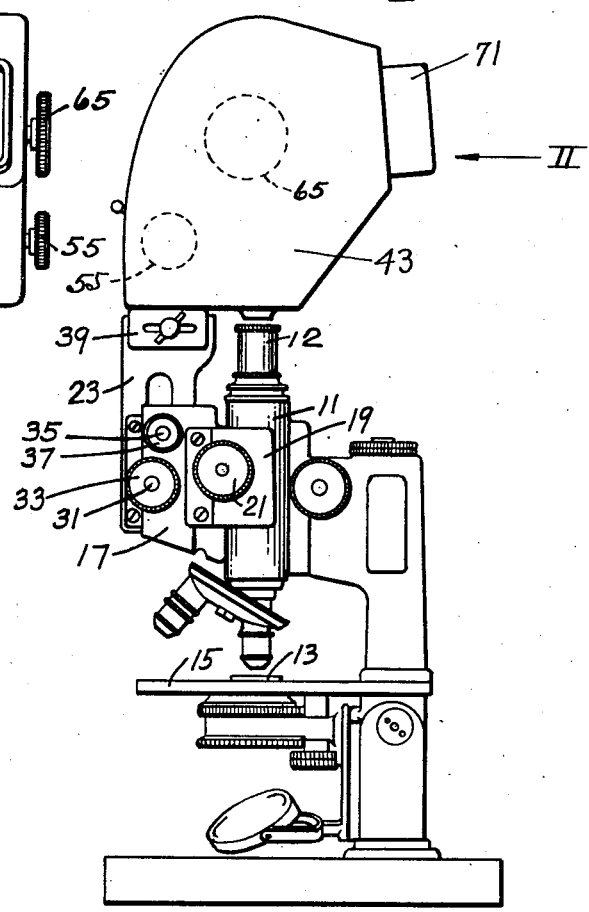
INVENTOR
GEORGE E. BURTON
BY
J. H. Weatherford
ATTY.

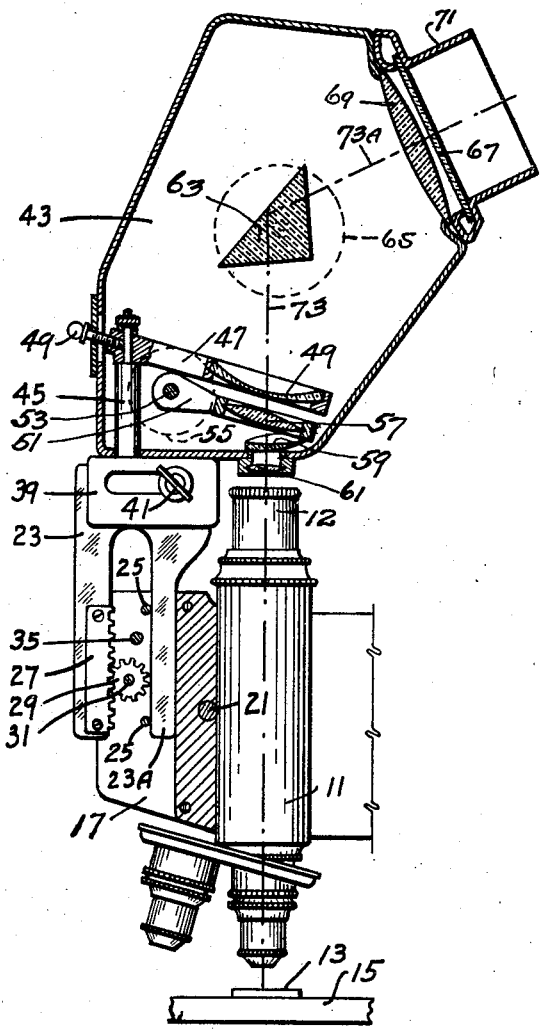

Patented May 28, 1946

2,401,224

UNITED STATES PATENT OFFICE 2,401,224

VIEWER FOR OPTICAL INSTRUMENTS

George E. Burton, Memphis, Tenn.

Application May 8, 1945, Serial No. 592,549

7 Claims. (Cl. 88—24)

This invention relates to attachments for optical instruments, particularly microscopes, through which attachment of the slide, or specimen being viewed through the microscope, may be enlarged and more easily studied, or even be observed by additional persons at the same time.

Viewing attachments have heretofore been known for this purpose, but difficulty has been found in accomplishing the enlargement and spread of the image by reason of the formation of white spots or stars at or adjacent the center of the image and the curvature of the reflected field.

The objects of the present invention are:

To provide a scanning attachment which may be readily secured to a microscope and may be laterally adjusted with reference thereto to accomplish proper centering with regard to the axis of the microscope and longitudinally adjusted along this axis;

To provide in such an attachment a lens group, including lenses relatively adjustable to each other and to other portions of the attachment for the purpose of eliminating the white spots or stars in the field of the image;

To provide in a scanner relatively fixed and adjustable lenses through which enlargement of the image may be effected and undesired white spots may be eliminated;

To provide in a scanning attachment adjustable means whereby the image may be deflected from the axial center line of the microscope to a viewing screen positioned at an angle more conveniently positioned for observation; and To provide means in adjacency to the screen for eliminating distortion of the image thrown on the screen;

To provide means for eliminating spherical appearance of the image thrown on the screen.

The means by which the foregoing and other objects are accomplished, and the manner of their accomplishment, will readily be understood from the following specification upon reference to the accompanying drawings, in which:

Fig. 1 is a side elevation of a typical microscope with the scanning device clamped thereon.

Fig. 2 is a fragmentary elevation looking in the direction of the arrow II of Fig. 1.

Fig. 3 is a sectional elevation of the scanning device taken on the line III—III of Fig. 2, and in elevation the barrel of the microscope to which it is attached.

Referring now to the drawings in which the various parts are indicated by numerals:

11 is the barrel of a usual microscope and 12 the eye piece. 13 is a slide being viewed and 15 the slide supporting table.

The present device includes a frame 17 to which are secured spring metal clamping ears 19, preferably leather lined, which are adapted to embrace opposite sides of the barrel 11 of the microscope and are clamped thereagainst by a thumb wheel and screw 21.

The frame 17 is vertically slotted to receive a yoke-like bracket 23 with one leg 23A of the bracket slidably confined against the bottom of the frame slot as by pins 25. Secured to the opposite leg 23B of the yoke bracket is a rack 27, with which meshes a pinion 29 disposed in the frame slot and secured on a transverse shaft 31 journalled in the side walls of the slot. The shaft 31 extends through the side walls of the frame slot and on one end carries a thumb wheel 33 by which the pinion 29 may be turned to raise or lower the yoke bracket. 35 is a clamping screw, and 37 a thumb nut through which the side walls of the frame may be clamped against the yoke bracket when adjusted.

Overlying the bracket 23 is a U-shaped member 39 which is slidable toward or away from the barrel of the microscope, the legs of the member depending along opposite sides of the bracket, being horizontally slotted to receive a clamping bolt 41 which passes through the yoke bracket 23 and being clamped thereto, when adjusted, by the thumb nut on the bolt.

Secured to and supported by the U member 39 is a substantially light tight casing 43 which may be of thin metal, plastic or other suitable material, which casing encloses a prism, certain lenses and other mechanisms including a vertical post 45, also secured to and extending upward from the U member 39. The post 45 is shouldered at its upper end to provide a vertically disposed pivotal support for a lens holder 47, which holder, deflected downward at a minor angle as of the nature of 15 degrees from the horizontal, extends from the support into overlying relation with the axis of the microscope and carries a concavo-convex lens 49, which, by adjustment of the support, is centered over the microscope.

Underlying the holder 47 and roughly parallel thereto, is a second holder 51 which is secured to a shaft 53 extending horizontally from side wall to side wall of the casing and journalled therein, this shaft having on its outer end a thumb wheel 55 through which angular adjustment, ordinarily of very minor amount, of the holder 51 relatively to the holder 47 may be made, this holder carrying a double convex lens 57, optically centered with the lens 49 and, by adjustment, with the microscope. Underlying the lens 57 is a sector of a concavo-convex lens 59, and below this a double-convex aperture lens 61.

Spaced above the upper of the lenses 49 is a prism 63 which is supported at its opposite ends in the side walls of the casing and is shiftably adjustable about its longitudinal axis by a thumb wheel 65.

Above and laterally displaced from the prism, the casing has a viewing opening which is covered by a translucent shield 67, as of ground glass, on which the image from the microscope is displayed. Interposed between the screen and the prism is a double convex lens 69. 71 is a visor shielding the screen from lateral incidental light.

In the particular embodiment of the device here chosen for illustration, the double convex aperture lens 61 is $f-2.0$; the concavo-convex lens section 59 is $f-4.50$; the double convex lens is $f+6.50$; the prism 63, a 90-45-45 degree prism, and the double convex lens 69, $f+6.65$, and the screen 67 is set at an angle of 70 degrees from the horizontal. The centers of the lenses 49, 57, and 61 are spaced equi-distant from the axis of the post 45 and with the prism 63 are centered in common on an optical axis 73, an angularly deflected continuation 73A of this axis extending through the center of the lens 59.

It will be understood that the focal length of the lenses is not critical.

In the device, the aperture lens 61 and lens-sector 59 combination are arranged at the bottom of the housing, the inclined lenses 57 and 49 forming a second combination are axially centered thereabove. Spaced above the second lens combination is the prism 63 and spaced laterally therefrom, and preferably slightly thereabove, the lens 69 and screen 71 are centered on the deflected axis 73A.

The aperture lens 61 and the lens sector 51 effect a lens combination or eye piece which picks up the image from the eye piece 12 of the microscope in normal condition as it is seen by the human eye, magnifies and projects it through the lens sector 59 and the lens combination 57, 49 to the prism 63 by which it is diverted through the lens 69 onto the viewing screen. The lens sector 59 of the eye piece flattens the spherical aberration of the eye piece image and reduces chromatic aberration.

The lens combination 57—49 further magnifies the image, the lens 49 in the combination reducing the chromatic aberration and flattening the image, and spreads and so disperses the light as to greatly reduce light spots on the screen. In addition, the angular positioning of the lens combination 57—49 with regard to the optical axis appear to deflect direct transmission of light-spot creating rays from an axial transmission path and does eliminate them from the image on the screen, and this is more effectively accomplished also by a very minor lateral shift of the lens 49 relatively to the lens 57 and the optical axis of the device, and/or a very minor shift of the inclination of the lens 59 relatively to the lens 49 and corresponding shift of the lens center relatively to the optical axis, in a direction at right angles to the center shift of the lens 49 of the combination, these two adjustments being made by trial and error from time to time as necessity requires.

The image rays are deflected or reflected by the prism 63 through the lens 69 which acts as a condenser to conserve light values on the screen 67 and increase illumination.

The microscope is focused in usual manner with a slide on the slide holder of the microscope.

The supporting frame is clamped to the barrel 11 of the microscope with the bracket 23 raised and the housing is shifted laterally to aline the aperture lens 61 over the eye piece of the microscope and the bracket 23 lowered into adjacency above the eye piece. Further observation and adjustment is made by the image displayed on the screen, these adjustments including turning the prism by the thumb wheel 65 to center the image on the screen, shift of the housing forward or backward into more accurate positioning of the aperture lens over the eye piece of the microscope, and raising or lowering the housing through the rack 27 and pinion 29, and the finer adjustment of the focus of the microscope itself. Should light spots appear in the image as thrown on the screen, the lens 49 is shifted about the vertical post 45 to slightly displace the lens with reference to the optical axis of the aperture lens and if necessary, the lens 51 is raised or lowered about the horizontal shaft 53 to effect a transverse shift at right angles to the lateral shift of the lens 49. Very slight shift of one or both in either direction usually effects the desired spot dispersal, but if not, opposite shift or combination of shifts effecting the result. One set-up subsequent focusing of the microscope may be effected with differing slides through the images on the screen, except in occasional cases of change of magnification of the microscope which may require removal of the viewer to direct focusing of the microscope, though even this is not usually found necessary.

It will be understood that much of the detail herein introduced is for purposes of illustration and that changes may be made therein without departing from the spirit and intent of the invention, and that only such detail as is disclosed in an individual claim shall be a part thereof.

I claim:

1. A viewing attachment for optical instruments, which attachment includes a substantially light tight housing having side, end and bottom walls, an aperture lens mounted in said bottom wall, and a translucent screen mounted in one of said end walls, and means for attaching said housing to and centering said aperture lens with regard to the optical axis of said instrument; a concavo-convex lens sector mounted on said bottom wall above said aperture lens, a lens combination above said lens sector including a double convex and a convexo-concave lens individually centered with respect to the optical axis of said aperture lens and having their axes inclined substantially equal amounts from said axis, a reflecting prism carried by the side walls of said housing, above and in the path of axial rays from said aperture lens and with its longitudinal axis at right angles thereto, said screen being spaced laterally from said prism at right angles to the axial rays reflected from said prism, and a double convex lens interposed between said prism and screen in adjacency to said screen.

2. A viewing attachment for optical instruments, and means for securing said attachment to said instrument, said attachment including a substantially light tight housing, a group of lenses, a prism, and a condensing lens and adjacent translucent viewing screen mounted in said housing; said lens group comprising a double convex aperture lens, a convexo-concave lens sector overlying and in adjacency to said aperture lens, and a lens combination comprising a double convex lens and a convexo-concave lens, about said lens sector, said combination lenses being individually substantially centered on the optical axis of said aperture lens, and having their respective axes deflected substantially equally from the optical axis of said aperture lens, said prism being disposed on said optical axis, with its longitudinal axis at right angles thereto and turned to deflect axial rays through the center of said condensing lens, said condensing lens and screen parallel thereto being positioned substantially at right angles to said axial rays.

3. A viewing attachment for optical instruments, and means for securing said attachment to said instrument, said attachment including a substantially light tight housing, a group of lenses, a prism, and a condensing lens and adjacent viewing screen mounted in said housing; said lens group comprising a double convex aperture lens, a convexo-concave lens sector overlying and in adjacency to said aperture lens, and a lens combination comprising a double convex and a convexo-concave lens above said lens sector, substantially centered on the optical axis of said aperture lens, with their optical axes deflected substantially equally from the optical axis of said aperture lens, means, respectively for shifting one of said combination lenses laterally, and for varying the deflecting angle of the other thereof, said prism being alined with said optical axis, with its longitudinal axis at right angles thereto, and turned to deflect axial rays through the center of said condensing lens, said condensing lens and said screen being parallel and positioned substantially at right angles to said axial rays.

4. A viewing attachment for optical instruments, and means for securing said attachment to said instrument, said attachment including a substantially light tight housing, a group of lenses, a prism, and a condensing lens and adjacent viewing screen mounted in said housing; said lens group comprising a double convex aperture lens, and a lens combination comprising a double convex and a convexo-concave lens above said aperture lens, and substantially centered on the optical axis of said aperture lens, with their optical axes deflected substantially equally from the optical axis of said aperture lens, means, respectively for shifting one of said combination lenses laterally, and for varying the deflecting angle of the other thereof, said prism being alined with said optical axis, with its longitudinal axis at right angles thereto, and turned to deflect axial rays through the center of said condensing lens, said condensing lens and said screen being parallel and positioned substantially at right angles to said axial rays.

5. A viewing attachment for optical instruments, and means for securing said attachment to said instrument, said attachment including a substantially light tight housing, a group of lenses, a prism, and a condensing lens and adjacent viewing screen mounted in said housing; said lens group comprising a double convex aperture lens, and a lens combination comprising a double convex and a convexo-concave lens above said aperture lens, and substantially centered on the optical axis of said aperture lens, with their optical axes deflected substantially equally from the optical axis of said aperture lens, means, respectively for shifting one of said combination lenses laterally, and for varying the deflecting angle of the other thereof, said prism being alined with said optical axis, with its longitudinal axis at right angles thereto, said prism mounting means journaling its opposite longitudinal ends, and including means for turning said prism about its longitudinal axis, said prism being normally turned to deflect axial rays through the center of said condensing lens, said condensing lens and said screen being parallel and positioned substantially at right angles to said axial rays.

6. A viewing attachment for optical instruments, which includes a substantially light tight housing mounting an aperture lens, a viewing screen spaced therefrom, and an interposed optical train for transferring an image projected through said lens to said screen; and means for attaching said housing to said instrument; said image transferring trains including a convexo-concave lens sector in adjacency to said aperture lens, and a lens combination comprising a double convex and a convexo-concave lens individually centered with respect to the axis of said aperture lens and having their axes inclined substantially equal minor amounts from the axis of said aperture lens, the means mounting the lenses of said combination respectively including means for shifting one of said lenses transversely to said axis and the other thereof to vary its angle of inclination.

7. A viewing attachment for optical instruments which includes a substantially light tight housing mounting an aperture lens, a viewing screen spaced therefrom, and an interposed optical train for transferring an image projected through said lens to said screen, and means for attaching said housing to said instrument; said image transferring train including a lens combination comprising a double convex and a convexo-concave lens individually centered with respect to the axis of said aperture lens and having their axes inclined substantially equal minor amounts from the axis of said aperture lens, the means mounting the lenses of said combination respectively including means for shifting one of said lenses transversely to said axis and the other thereof to vary its angle of inclination.

GEORGE E. BURTON.